United States Patent
Zimmel et al.

(10) Patent No.: US 11,846,811 B2
(45) Date of Patent: Dec. 19, 2023

(54) TUNED FIBER OPTIC CONNECTOR

(71) Applicant: COMMSCOPE TECHNOLOGIES LLC, Hickory, NC (US)

(72) Inventors: Steven Conrad Zimmel, Minneapolis, MN (US); Gregory J. Schaible, Lakeville, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/627,579

(22) PCT Filed: Jul. 15, 2020

(86) PCT No.: PCT/US2020/042152
§ 371 (c)(1),
(2) Date: Jan. 14, 2022

(87) PCT Pub. No.: WO2021/011666
PCT Pub. Date: Jan. 21, 2021

(65) Prior Publication Data
US 2022/0357523 A1 Nov. 10, 2022

Related U.S. Application Data

(60) Provisional application No. 62/875,348, filed on Jul. 17, 2019.

(51) Int. Cl.
*G02B 6/38* (2006.01)
(52) U.S. Cl.
CPC ......... *G02B 6/3871* (2013.01); *G02B 6/3893* (2013.01)

(58) Field of Classification Search
CPC ........................... G02B 6/3871; G02B 6/3893
See application file for complete search history.

(56) References Cited

U.S. PATENT DOCUMENTS

| | | | |
|---|---|---|---|
| 5,096,276 A | 3/1992 | Gerace et al. | |
| 5,181,267 A | 1/1993 | Gerace et al. | |
| 5,317,663 A | 5/1994 | Beard et al. | |

(Continued)

FOREIGN PATENT DOCUMENTS

| | | |
|---|---|---|
| CN | 101091131 A | 12/2007 |
| CN | 104169764 A | 11/2014 |

(Continued)

OTHER PUBLICATIONS

International Search Report and Written Opinion of the International Searching Authority for International Patent Application No. PCT/US2020/041955 dated Nov. 5, 2020, 14 pages.

(Continued)

*Primary Examiner* — Daniel Petkovsek
(74) *Attorney, Agent, or Firm* — Merchant & Gould P.C.

(57) ABSTRACT

A fiber optic connector with a hub extension positioned on the hub of the connector. Prior to assembly of the connector with the rear boot, the hub and ferrule assembly can be pushed backward within the front and rear housings to clear an anti-rotation portion of the front housing and turned for tuning. After complete assembly of the rear boot, the hub extension bottoms out against the boot prior to the hub and ferrule assembly disengaging the anti-rotation portion of the front housing, thereby maintaining the tuned position.

12 Claims, 11 Drawing Sheets

(56) References Cited

U.S. PATENT DOCUMENTS

| | | | |
|---|---|---|---|
| 5,375,183 A | 12/1994 | Edwards et al. | |
| 5,428,703 A | 6/1995 | Lee | |
| 5,778,126 A | 7/1998 | Saitoh | |
| 6,142,676 A | 11/2000 | Lu | |
| 6,155,146 A * | 12/2000 | Andrews | G02B 6/3843 81/461 |
| 6,629,782 B2 | 10/2003 | McPhee et al. | |
| 7,281,859 B2 | 10/2007 | Mudd et al. | |
| 7,997,806 B2 | 8/2011 | Nakagawa | |
| 8,496,386 B2 | 7/2013 | Kerr et al. | |
| 8,858,090 B2 | 10/2014 | Henke et al. | |
| 9,057,849 B2 | 6/2015 | Park et al. | |
| 11,150,412 B2 * | 10/2021 | Zimmel | G02B 6/3656 |
| 2002/0081077 A1 | 6/2002 | Nault | |
| 2003/0147598 A1 | 8/2003 | McPhee et al. | |
| 2004/0151437 A1 | 8/2004 | Marrs et al. | |
| 2005/0232553 A1 | 10/2005 | Holmquist | |
| 2005/0232554 A1 | 10/2005 | Zimmel et al. | |
| 2006/0115219 A1 | 6/2006 | Mudd et al. | |
| 2007/0183721 A1 | 8/2007 | Holmquist et al. | |
| 2009/0214164 A1 | 8/2009 | Nakagawa | |
| 2011/0008003 A1 | 1/2011 | Tamekuni et al. | |
| 2011/0075972 A1 | 3/2011 | Parkman, III | |
| 2013/0089294 A1 | 4/2013 | Zimmel | |
| 2013/0315541 A1 | 11/2013 | Nhep et al. | |
| 2013/0322826 A1 | 12/2013 | Henke et al. | |
| 2018/0059334 A1 | 3/2018 | Lu et al. | |
| 2018/0224608 A1 | 8/2018 | Liu et al. | |
| 2022/0260788 A1 | 8/2022 | Zimmel et al. | |
| 2022/0269014 A1 | 8/2022 | Holmquist et al. | |

FOREIGN PATENT DOCUMENTS

| | | |
|---|---|---|
| CN | 109716194 A | 5/2019 |
| WO | 2014/031556 A1 | 2/2014 |

OTHER PUBLICATIONS

International International Search Report and Written Opinion of the International Searching Authority for International Patent Application No. PCT/US2020/042135 dated Nov. 5, 2020, 9 pages.

International International Search Report and Written Opinion of the International Searching Authority for International Patent Application No. PCT/US2020/042368 dated Nov. 5, 2020, 10 pages.

International International Search Report and Written Opinion of the International Searching Authority for International Patent Application No. PCT/US2020/42152 dated Nov. 6, 2020, 9 pages.

Extended European Search Report for Application No. 20841353.4 dated Jul. 14, 2023.

Partial Supplementary European Search Report for Application No. 20840593.6 dated Jul. 4, 2023.

* cited by examiner

TUNED FIBER OPTIC CONNECTOR

CROSS-REFERENCE TO RELATED APPLICATION

This application is a National Stage Application of PCT/US2020/042152, filed on Jul. 15, 2020, which claims the benefit of U.S. Patent Application Ser. No. 62/875,348, filed on Jul. 17, 2019, the disclosures of which are incorporated herein by reference in their entireties. To the extent appropriate, a claim of priority is made to each of the above disclosed applications.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663, assigned to ADC Telecommunications, Inc. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers. Another connector and mating adapter is shown in U.S. Pat. No. 6,142,676, assigned to ADC Telecommunications, Inc.

Signal losses within a system often occur within the connection between two optical fiber cores. Due to manufacturing tolerances of the ferrule outer diameter to inner diameter concentricity, ferrule inner diameter hole size and fiber outer diameter, and fiber core to fiber outer diameter concentricity, when the fiber is inserted into the ferrule the core of a fiber may not and typically does not end up perfectly centered relative to the ferrule outer diameter. If one or both of the fibers are off center, when they are connected within an adapter, the fibers will not be aligned and thus there will be a signal loss when the signal is transmitted between the two fibers. It is therefore desirable to tune a connector to minimize this signal loss. Tuning can be accomplished by measuring signal characteristics through the connector and/or examining physical properties of the connector, and then determining the optimal position of the ferrule and fiber in the connector.

SUMMARY

A fiber optic connector with a hub extension positioned on the hub of the connector. Prior to assembly of the connector with the rear boot, the hub and ferrule assembly can be pushed backward within the front and rear housings to clear an anti-rotation portion of the front housing and turned for tuning. After complete assembly of the rear boot, the hub extension bottoms out against the boot prior to the hub and ferrule assembly disengaging the anti-rotation portion of the front housing, thereby maintaining the tuned position.

DETAILED DESCRIPTION

The present disclosure is directed to systems and methods for manufacturing and tuning fiber optic connectors.

Figure 1:
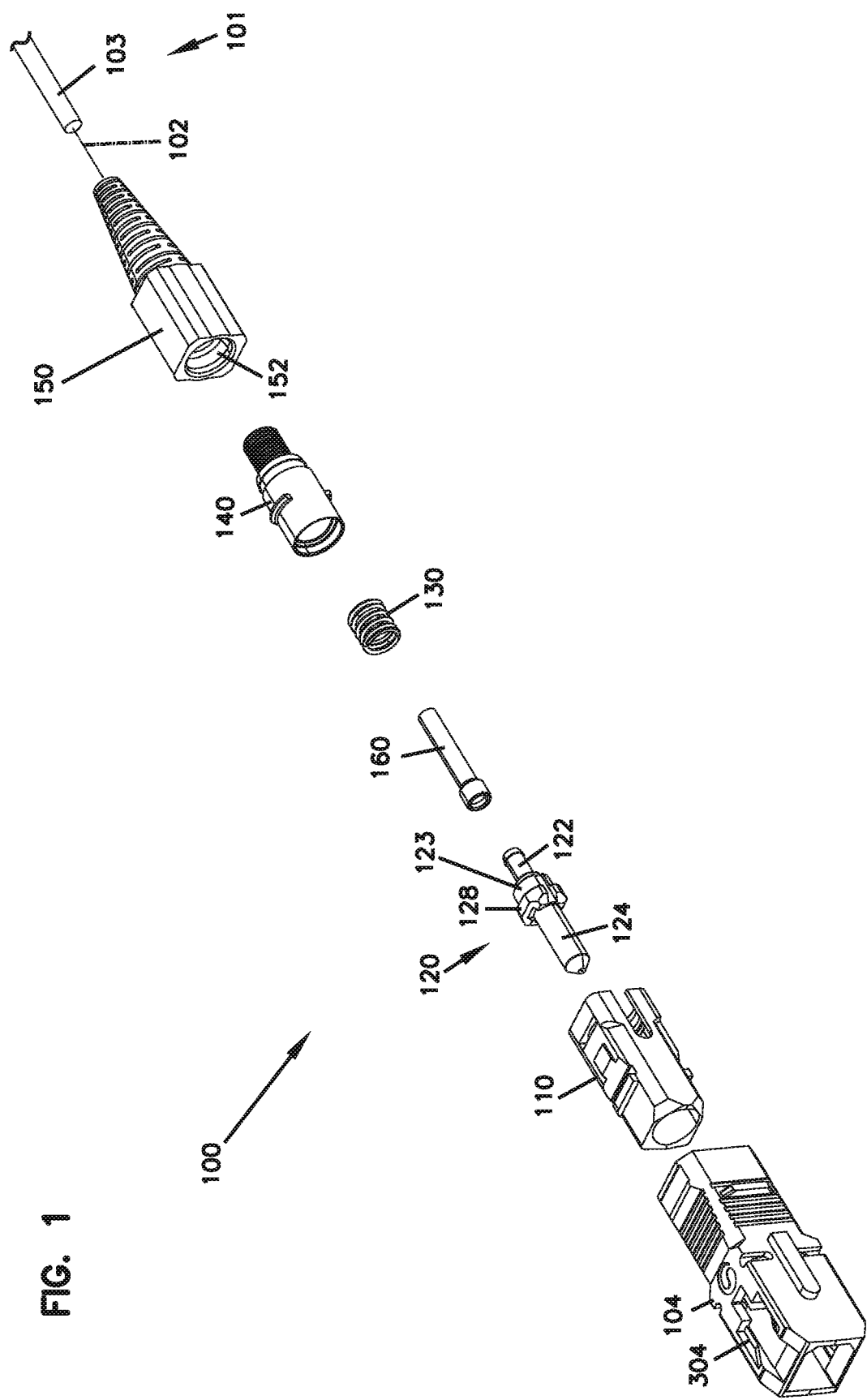
FIG. 1 is an exploded view of an example embodiment of a fiber optic connector made in accordance with the present disclosure.

FIG. 1 is an exploded view of an example connector 100 illustrating components made in accordance with the present disclosure.

The connector 100 includes an outer key member 104, a front housing 110, a rear housing 140, and a boot 150 with a bore 152. Also included is a hub/ferrule assembly 120 with a hub 122 and a ferrule 124. The hub 122 includes an anti-rotation portion 128 and a cylindrical rear portion 123. The hub 122 is connected to the ferrule 124, such as with adhesive or with an interference fit. A spring 130 is also provided. A fiber optic cable 101 is shown including a fiber 102 and a jacket 103. The cable 101 is of the type without reinforcing strength members.

Also shown is a hub extension member 160 that is coupled to the hub 122 and extends rearwardly towards the boot 150. As described further below, the hub extension member 160 maintains the connector 100 in a tuned state upon full assembly of the connector 100.

Figure 2:
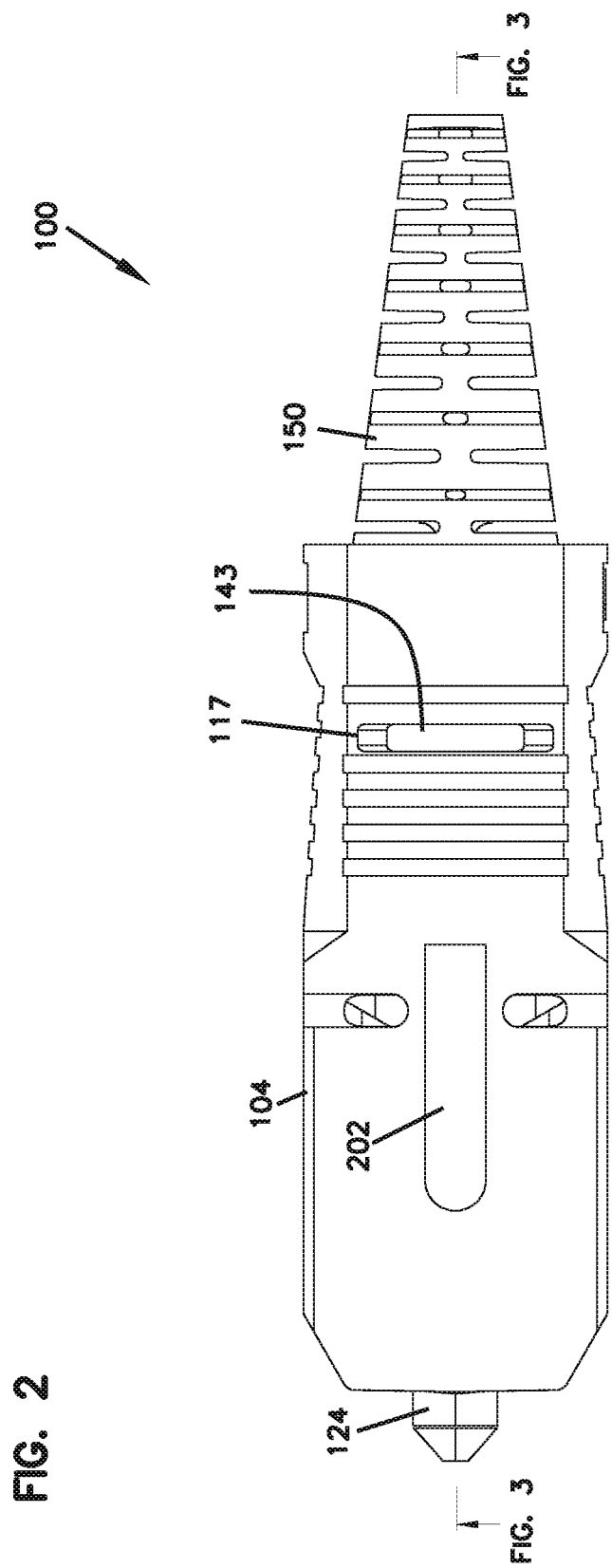
FIG. 2 is a side view of the connector of FIG. 1 in a fully assembled state.
Figure 3:
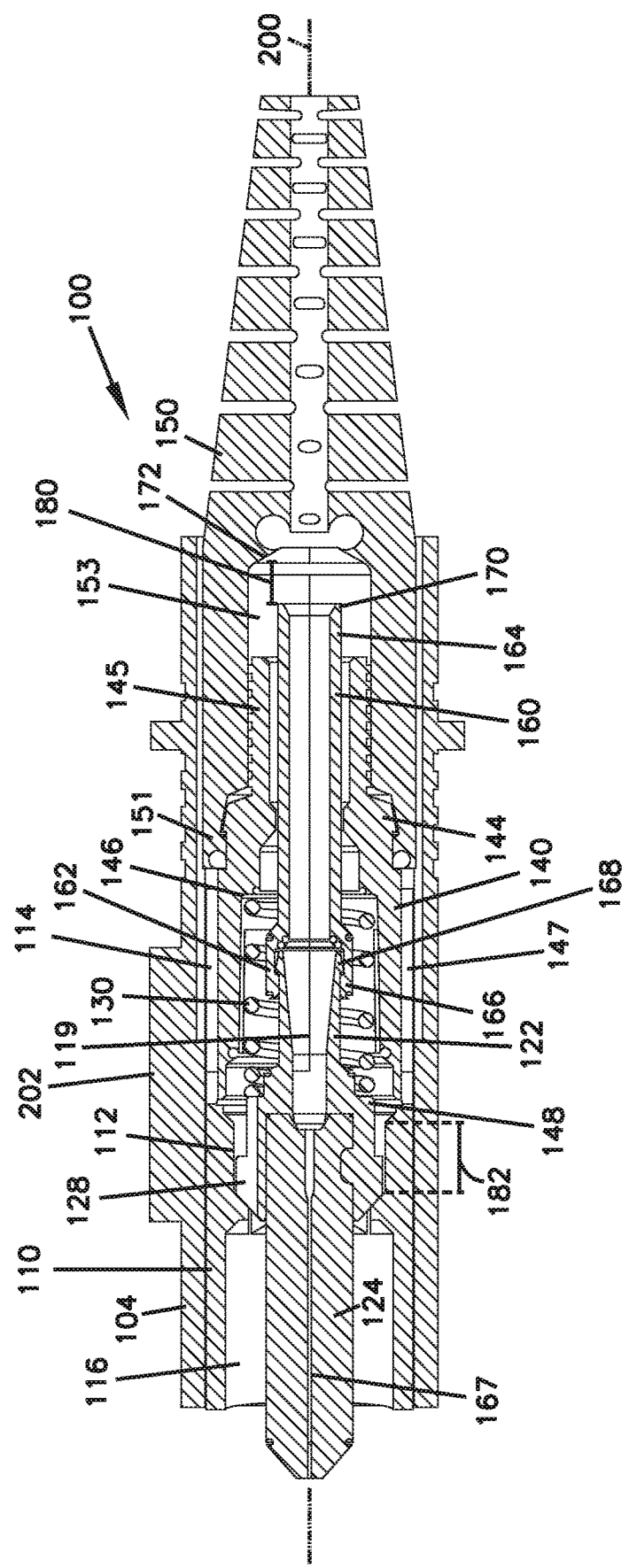
FIG. 3 is a cross-sectional view of the connector shown in FIG. 2.

Referring to FIGS. 2 and 3, the connector 100 is shown in a fully assembled state. The key member 104 includes a key 202 that defines the tuned position for the connector 100.

The front housing 110 of the connector 100 extends along a longitudinal axis 200 and defines an anti-rotation seat 112 and a cavity 114. The ferrule 124 extends through a front bore 116 of the front housing 110 and includes a passage 167. The anti-rotation portion 128 of the hub 122 is slidingly engaged along the longitudinal axis 200 in the anti-rotation seat 112.

Figure 4:
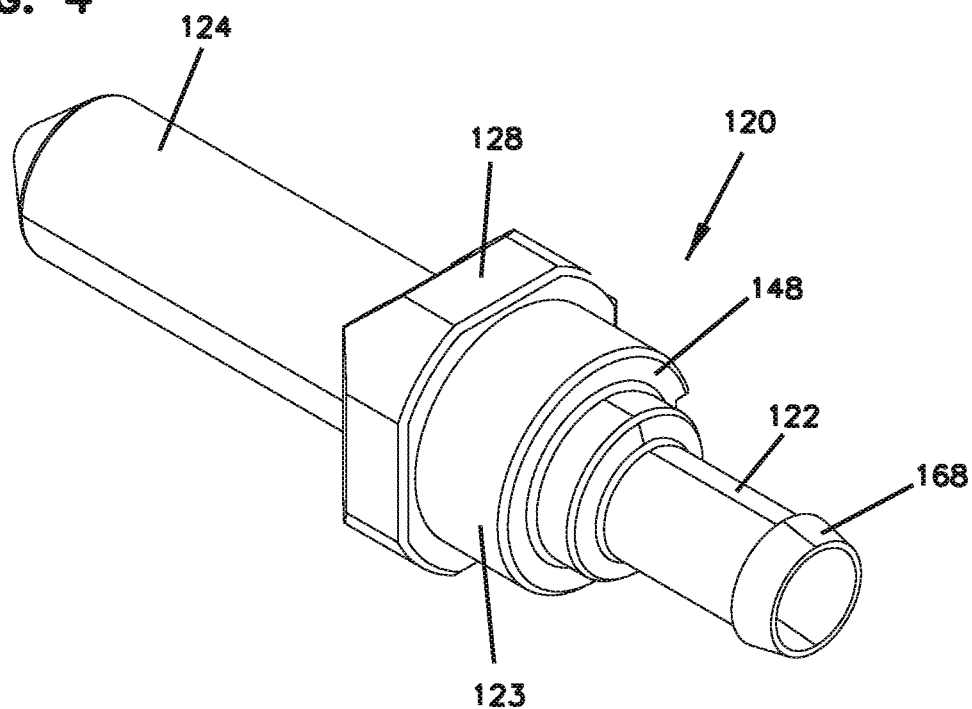
FIG. 4 is a perspective view of an example hub/ferrule assembly of the connector shown in FIG. 1.
Figure 5:
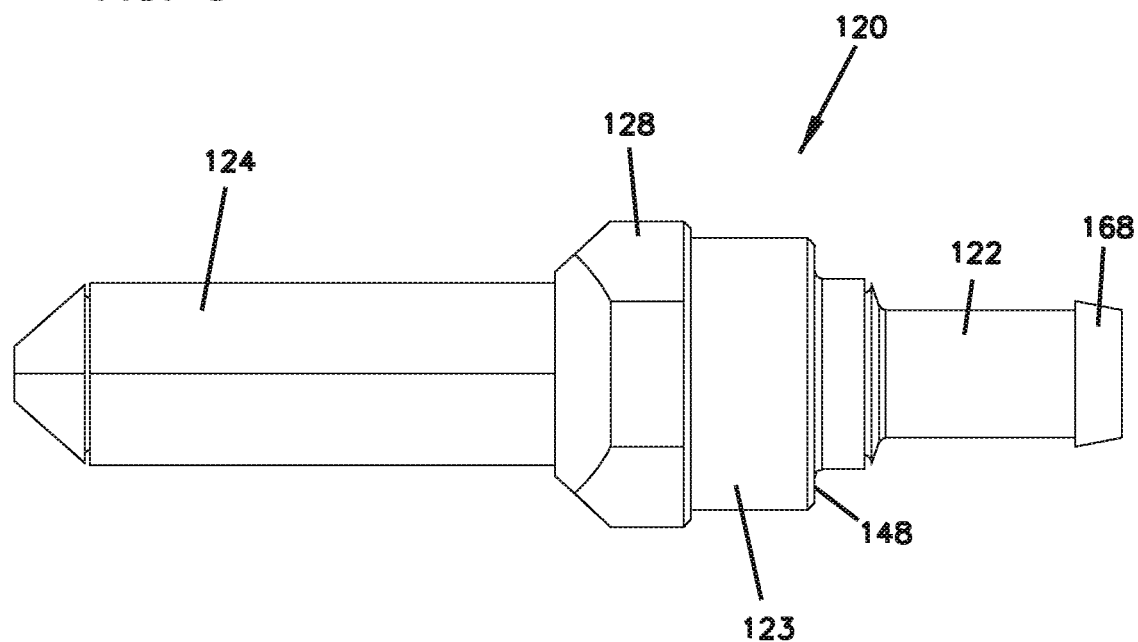
FIG. 5 is a side view of the hub/ferrule assembly shown in FIG. 4.
Figure 6:
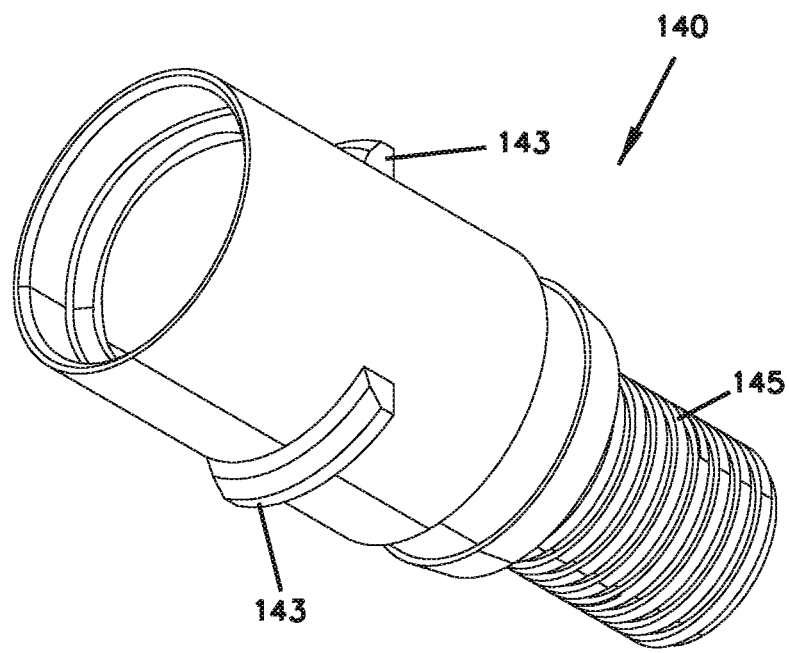
FIG. 6 is perspective view of an example rear housing of the connector shown in FIG. 1.
Figure 7:
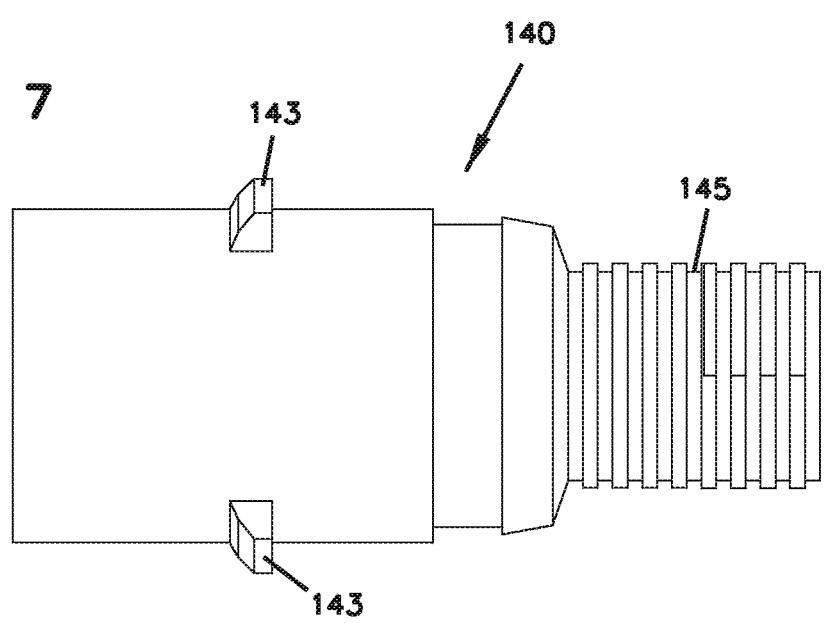
FIG. 7 is a side view of the rear housing shown in FIG. 6.
Figure 8:
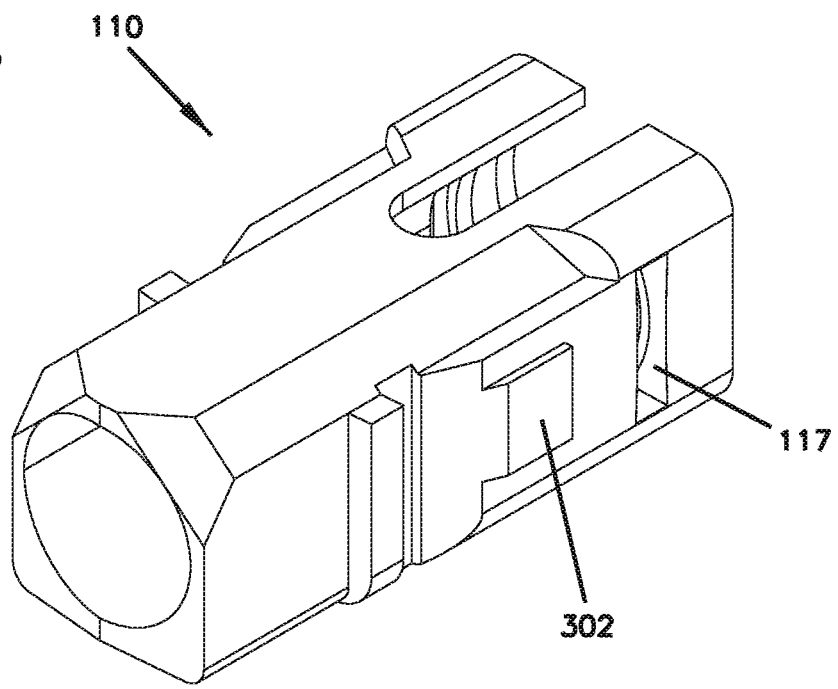
FIG. 8 is perspective view of an example front housing of the connector shown in FIG. 1.
Figure 9:
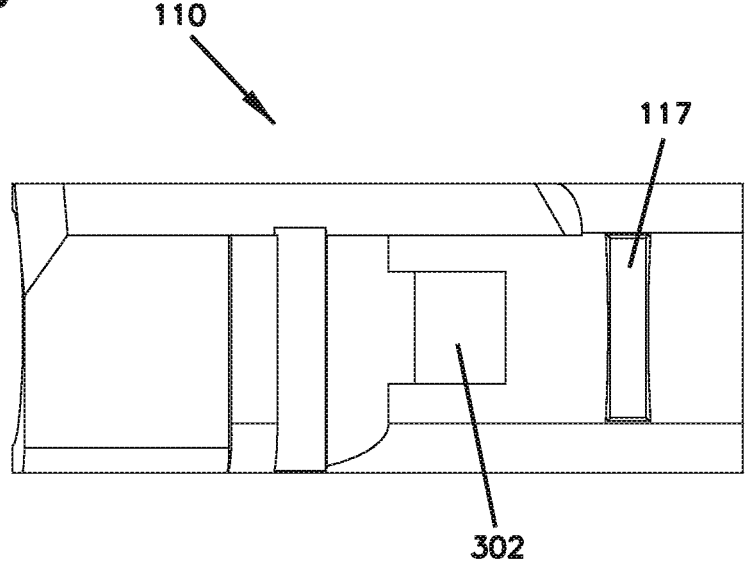
FIG. 9 is a side view of the front housing shown in FIG. 8.

In the example embodiment, the anti-rotation portion 128 is shaped in an octagonal configuration (see FIGS. 4-5) and the anti-rotation seat 112 defines a seat of a complementary geometry. The anti-rotation portion 128 and the anti-rotation seat 112 allow for sliding along the longitudinal axis 200, but prevent relative rotation. Other mating shapes and configurations are also possible. The elongated cylindrical rear portion 123 of the hub 122 extends into the cavity 114 of the front housing 110. The hub 122 includes a passage 119 extending along the longitudinal axis 200.

The spring 130 surrounds the hub 122. The spring 130 is captured between a surface 148 of the anti-rotation portion 128 and a surface 146 of the rear housing 140. The spring 130 functions to bias the anti-rotation portion 128 of the hub 122 into the anti-rotation seat 112 of the front housing 110. Because the ferrule 124 is connected to the hub 122, the spring 130 also functions to bias the ferrule 124 in a forward direction through the front bore 116.

Figure 10:
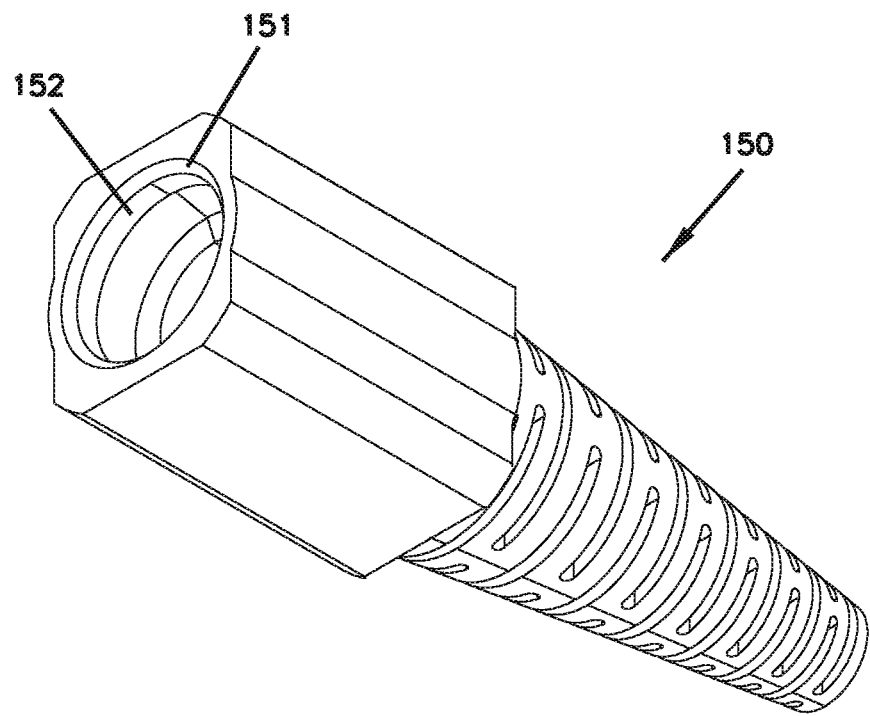
FIG. 10 is perspective view of an example boot of the connector shown in FIG. 1.
Figure 11:
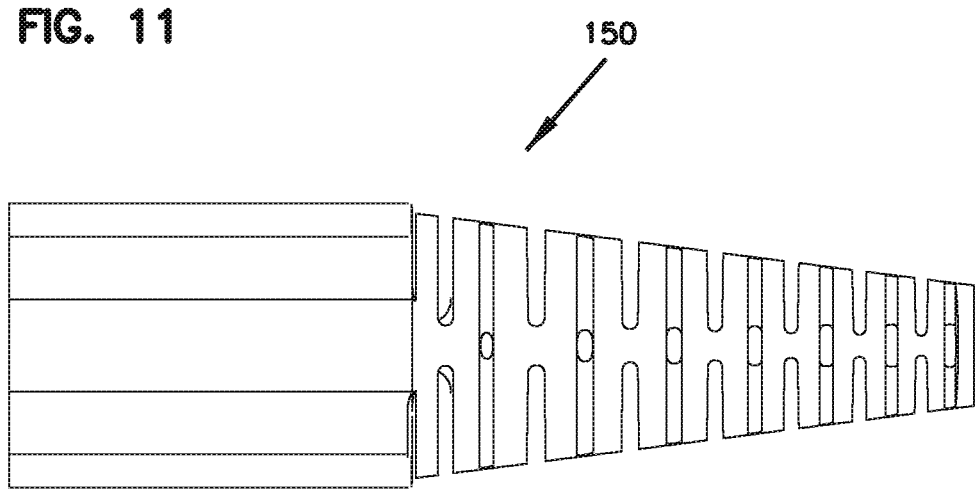
FIG. 11 is a side view of the boot shown in FIG. 10.

Outer protrusions 143 of the rear housing 140 are held engagingly in openings 117 formed by the front housing 110. See FIGS. 6-9. In the fully-assembled state as shown, the rear housing 140 includes a passage 147. A rear portion 145 of the rear housing 140 extends along the longitudinal axis 200 into the bore 152 of the boot 150. See FIGS. 10-11. An arm 151 of the boot 150 extend over tabs 144 formed by the rear portion 145 to hold the rear housing 140 to the boot 150. A passage 153 extending through the boot 150 is coaxially aligned with passage 147 of the rear housing 140 and passage 119 of the hub 122. The passage 119, in turn, is coaxially aligned with the passage 167 of the ferrule 124 and is sized to receive a bare fiber of a fiber optic cable.

Figure 12:
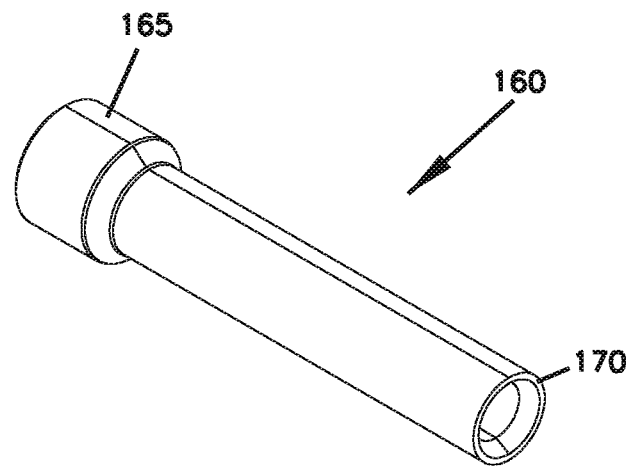
FIG. 12 is perspective view of a hub extension member of the connector shown in FIG. 1.
Figure 13:
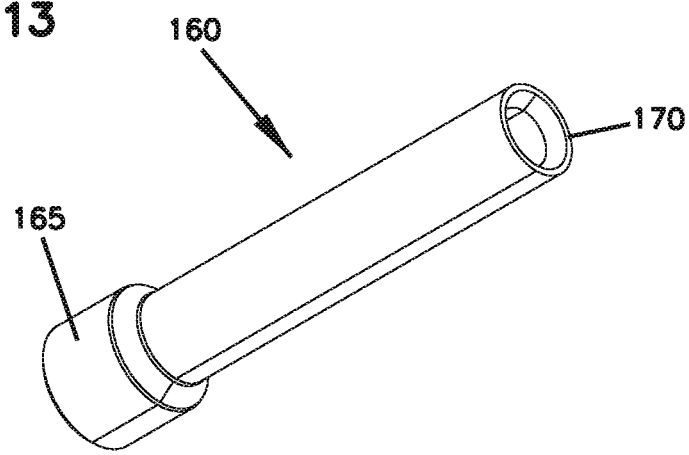
FIG. 13 is another perspective view of the hub extension member shown in FIG. 12.
Figure 14:
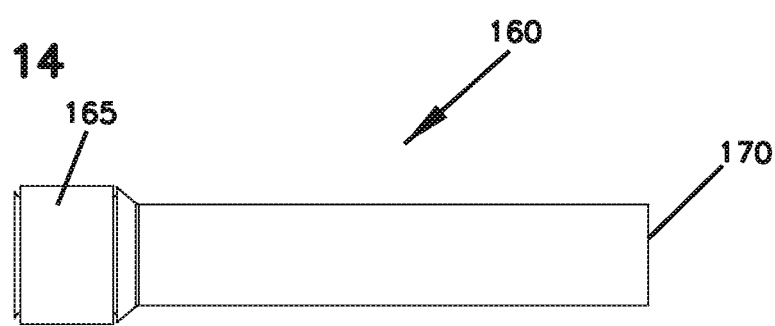
FIG. 14 is a side view of the hub extension member shown in FIG. 12.

An enlarged front portion 165 of the hub extension member 160 (see FIGS. 12-14) includes an arm 166 to engage tabs 168 of the hub 122 to couple the hub extension member 160 to the hub 122. The hub extension member 160 extends rearwardly into the passage 153 formed by the boot 150. An end 170 of the hub extension member 160 is positioned relative to a surface 172 of the boot 150 so that, in the fully assembled state as depicted, the end 170 contacts the surface 172 of the boot 150 and limits further rearward travel of the hub 122 before the anti-rotation portion 128 clears the anti-rotation seat 112, so that the connector 100 cannot become un-tuned. In other words, a distance 180 from the end 170 to the surface 172 is smaller than the distance 182 required to remove the anti-rotation portion 128 from the anti-rotation seat 112. See FIGS. 1 and 15.

The cable 101, not shown in FIGS. 2-3, is extended through the passages 153 and 147, and the fiber 102 is extended through passages 119 and 167 and is glued to the ferrule 124. The jacket 103 extends through passage 119 and can abut the ferrule 124. The jacket 103 is glued to the hub 122.

The connector 100 can be assembled and tuned as follows. The hub 122 and ferrule 124 are inserted into the front housing 110 so that the anti-rotation portion 128 of the hub 122 sits in the anti-rotation seat 112 of the front housing 110. The rear housing 140 is then slid into the front housing 110 until the outer protrusions 143 of the rear housing 140 are held engagingly in openings 117 formed by the front housing 110 to form an integral unit. In other words, the front and rear housings 110, 140 are fully connected to each other. The front and rear housings 110 and 140 can be pressed together in any convenient manner, such as with a press or clamping tool. This forms a semi-assembled state without the boot 150.

Figure 16:
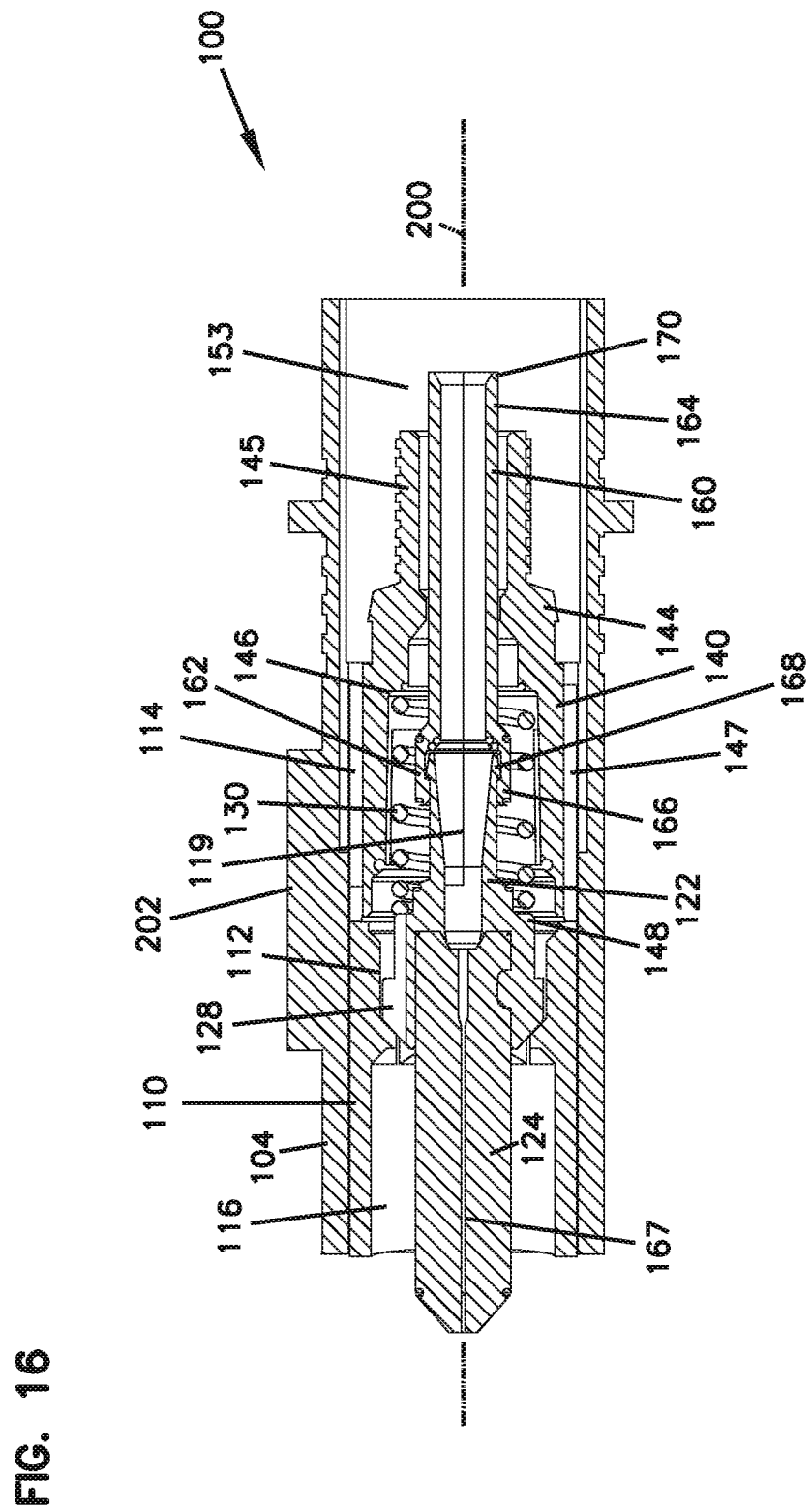
FIG. 16 is a cross-sectional view of the front and rear housings of the connector shown in FIG. 1 in a semi-assembled state.
Figure 17:
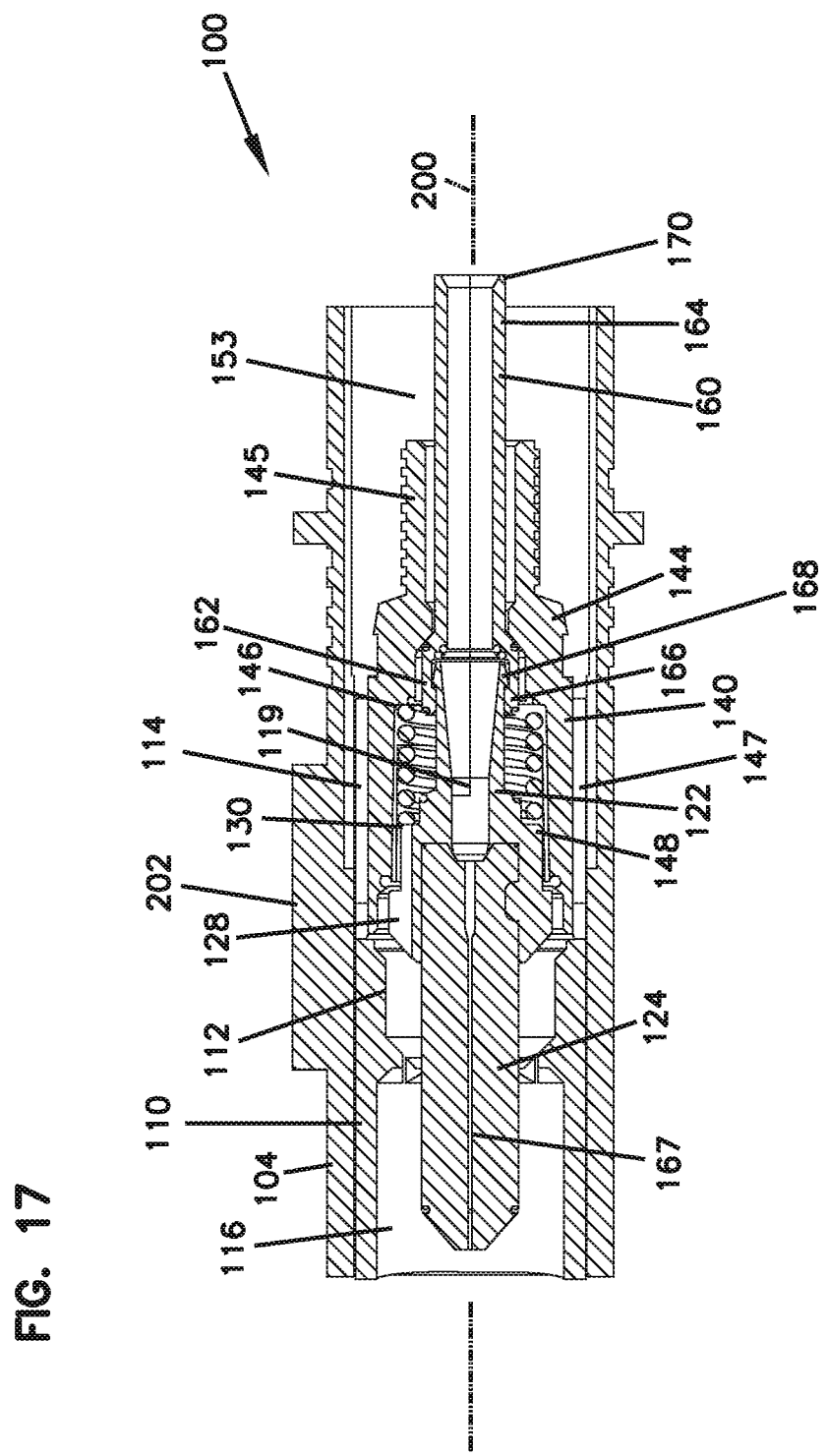
FIG. 17 is another cross-sectional view of the front and rear housings shown in FIG. 16 with the hub/ferrule assembly pressed rearwardly.

In this semi-assembled state shown in FIG. 16, the ferrule 124 and the hub 122 can be pushed back against the biasing force of the spring 130 along the longitudinal axis 200 towards the rear housing 140 so that the anti-rotation portion 128 of the hub 122 enters the cavity 114 and completely clears the anti-rotation seat 112. This can be accomplished because the boot 150 has not yet been coupled to the rear housing 140. In this position, because the anti-rotation portion 128 of the hub 122 is no longer engaged in the anti-rotation seat 112 of the front housing 110, the ferrule 124 and the hub 122 can be rotated about the longitudinal axis 200 to tune the connector 100 as desired. See FIG. 17. Tuning can thereupon be performed to determine the desired tuned position. Tuning can be by any method useful to determine the desired orientation of the ferrule 124 in the connector 100.

Once tuning is completed, the hub/ferrule assembly 120 is released so that the anti-rotation portion 128 of the hub 122 again sits in the anti-rotation seat 112 of the front housing 110 to limit rotation of the hub/ferrule assembly 120 and thereby maintain the tuned position.

After tuning is completed, the boot 150 is moved longitudinally along the axis 200 so that rear housing 140 is received in the bore 152 and extends into the passage 153. The arms 151 of the boot 150 extend over tabs 144 formed by the rear portion 145 to couple the rear housing 140 to the boot 150.

Prior to or after tuning, the outer key member 104 is oriented relative to the front housing 110, and the outer key member 104 is slid onto the front housing 110 until a tab 302 is received in an opening 304 of the outer key member 104. See FIGS. 1 and 8-9. In this fully-assembled state, the key 202 indicates the tuned position when the connector 100 is coupled to another connector.

Figure 15:
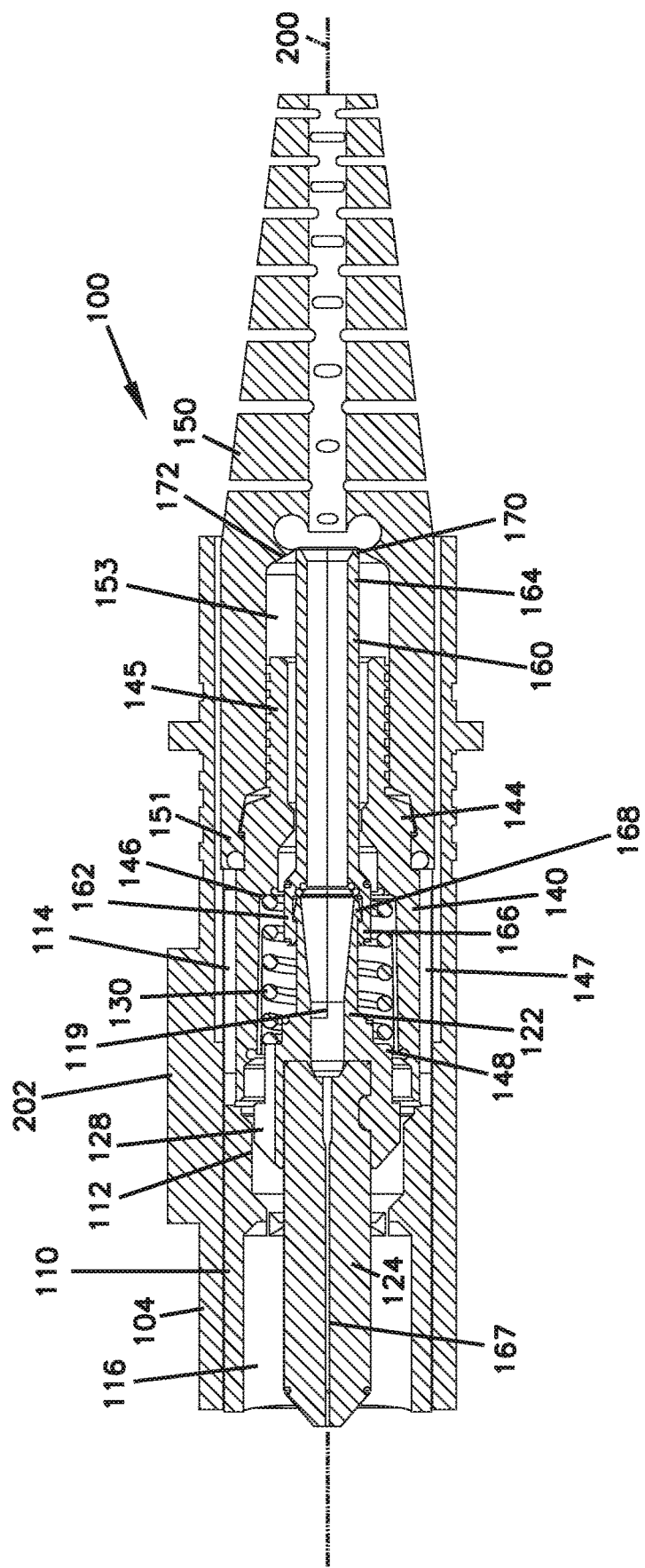
FIG. 15 is a cross-sectional view of the connector shown in FIG. 1 with the hub/ferrule assembly pressed rearwardly.

In the completely assembled configuration, as shown in FIGS. 2-3 and 15, the longitudinal distance 182 along the longitudinal axis 200 between the anti-rotation seat 112 and the rear surface 146 of the rear housing 140 is greater than the distance 180 between the end 170 of the hub extension member 160 to the surface 172 of the boot 150. In this state, it is not possible to push the ferrule 124 and the hub 122 along the longitudinal axis 200 back into the cavity 114 far enough to allow the anti-rotation portion 128 of the hub 122 to completely clear the anti-rotation seat 112 of the front housing 110.

This is illustrated in the completely assembled connector 100 of FIG. 15, wherein the ferrule 124 and the hub 122 are pushed back into the cavity 114 until the end 170 of the hub extension member 160 bottoms out against the surface 172 of the boot 150. The hub 122 and the ferrule 124 cannot travel any farther back along the longitudinal axis 200. In this position, the anti-rotation portion 128 of the hub 122 cannot completely clear the anti-rotation seat 112 of the front housing 110, thereby preventing rotation of the hub 122 and ferrule 124 about the longitudinal axis 200.

Therefore, in the fully assembled configuration of the connector 100, neither a pushing force applied to the ferrule 124 nor a pulling force applied to the cable attached to the connector 100 and translated through the optical fiber to the ferrule 122 can cause the anti-rotation portion 128 to completely clearing the anti-rotation seat 112. This prevents rotation of the ferrule 124, thereby assuring that a fully assembled connector 100 will not become un-tuned. Resulting connector 100 is tuned with respect to the exterior structure mateable with an adapter of the type in U.S. Pat. No. 5,317,663. The configuration of the connector 100 is such that it is keyed so that it can only be received in the adapter in one orientation.

The advantages embodied in connectors made in accordance to the invention are applicable to a variety of fiber optic cable and connector types. The invention is particularly convenient for smaller cables, such as, for example, 0.900-millimeter cable, which does not include strength reinforcing members. Pulling rearwardly on the cable may pull the ferrule rearwardly, against the spring, but the hub will not disengage from the housing, thereby maintaining the tuned state of the connector.

Although the hub extension member 160 is illustrated as being separate from the hub 122, in alternative embodiments the hub can be elongated to form an integral extension (see U.S. Pat. No. 6,629,782 as an example, the entirety of which is hereby incorporated by reference) that extends towards the boot 150. Other configurations are possible.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A fiber optic connector, comprising:
    an optical fiber;
    a ferrule mounted to the optical fiber;
    a hub retainably engaging the ferrule, wherein the hub includes an elongated rear portion coupled to an anti-rotation portion;
    a hub extension member coupled to the hub;
    a rear housing having an external surface and a bore for receiving the optical fiber;
    a front housing having an internal surface for receiving and engaging the external surface of the rear housing, having an anti-rotation seat configured to engage the anti-rotation portion of the hub, and defining a cavity in communication with the anti-rotation seat;
    a spring captured between the anti-rotation portion of the hub and the rear housing to bias the anti-rotation portion of the hub into the anti-rotation seat of the front housing; and
    a rear boot defining an arm that is configured to extend over a tab of the rear housing for removably coupling the rear boot directly to the rear housing, wherein when the rear boot is coupled directly to the rear housing, at least a portion of the rear housing is positioned between the rear boot and the hub extension member in a radial direction such that the arm of the rear boot used for coupling the rear boot to the rear housing does not contact the hub extension member in coupling the rear boot to the rear housing;
    wherein a length of the hub extension member is sized so that:
    (1) the anti-rotation portion of the hub can be pushed completely into the cavity and rotated to tune the fiber optic connector prior to the rear boot being coupled to the rear housing; and
    (2) an end of the elongated rear portion of the hub abuts the rear boot so that the anti-rotation portion of the hub cannot be completely pushed back into the cavity and rotated when the rear boot is coupled to the rear housing.

2. The fiber optic connector of claim 1, wherein the rear housing is coupled to the front housing to form a semi-assembled state.

3. The fiber optic connector of claim 2, wherein the fiber optic connector is tunable in the semi-assembled state.

4. The fiber optic connector of claim 3, wherein the fiber optic connector is un-tunable when the boot is coupled to the rear housing to form a fully-assembled state.

5. The fiber optic connector of claim 1, further comprising a key member coupled to the front housing.

6. The fiber optic connector of claim 1, wherein an end of the hub extension member is positioned relative to a surface of the rear boot so that, in a fully assembled state, the end contacts the surface of the rear boot and limits further rearward travel of the hub before the anti-rotation portion clears the anti-rotation seat, so that the fiber optic connector cannot become un-tuned.

7. The fiber optic connector of claim 6, wherein a distance from the end to the surface is smaller than the distance required to remove the anti-rotation portion from the anti-rotation seat.

8. The fiber optic connector of claim 1, wherein the anti-rotation portion is shaped in an octagonal configuration and the anti-rotation seat defines a seat of a complementary geometry.

9. A method of tuning a fiber optic connector, the fiber optic connector including an optical fiber; a ferrule mounted to the optical fiber; a hub retainably engaging the ferrule, wherein the hub includes an elongated rear portion coupled to an anti-rotation portion; a hub extension member coupled to the hub; a rear housing having an external surface and a bore for receiving the optical fiber; a front housing having an internal surface for receiving and engaging the external surface of the rear housing, having an anti-rotation seat configured to engage the anti-rotation portion of the hub, and defining a cavity in communication with the anti-rotation seat; and a spring captured between the anti-rotation portion of the hub and the rear housing to bias the anti-rotation portion of the hub into the anti-rotation seat of the front housing, the method comprising:
    pushing the anti-rotation portion of the hub completely into the cavity;
    rotating the anti-rotation portion of the hub to tune the fiber optic connector;
    providing a rear boot defining an arm that is configured to extend over a tab of the rear housing for removable coupling of the rear boot to the rear housing;
    coupling the rear boot directly to the rear housing such that, when the rear boot is coupled directly to the rear housing, at least a portion of the rear housing is positioned between the rear boot and the hub extension member in a radial direction and the arm of the rear boot used for coupling the rear boot to the rear housing does not contact the hub extension member when coupling the rear boot to the rear housing; and abutting an end of the elongated rear portion of the hub to the rear boot so that the anti-rotation portion of the hub cannot be completely pushed back into the cavity and rotated.

10. The method of claim 9, wherein the rear housing is coupled to the front housing to form a semi-assembled state.

11. The method of claim 10, wherein the fiber optic connector is tunable in the semi-assembled state.

12. The method of claim 11, wherein the fiber optic connector is un-tunable when the rear boot is coupled to the rear housing to form a fully-assembled state.

* * * * *